May 21, 1946.   D. C. HOWARD   2,400,553
DIAL AND POINTER APPARATUS
Filed March 31, 1945   3 Sheets-Sheet 2

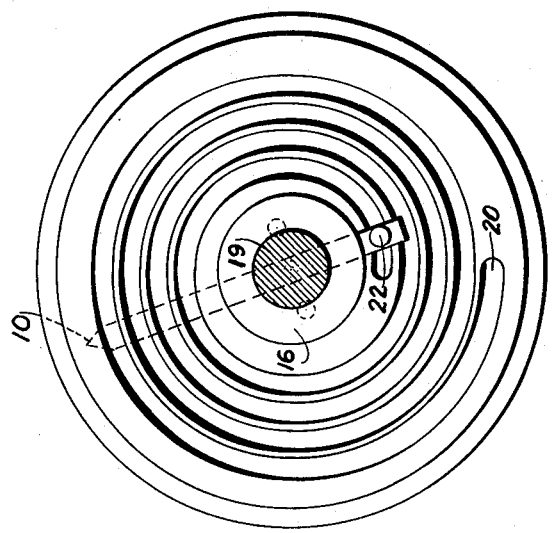
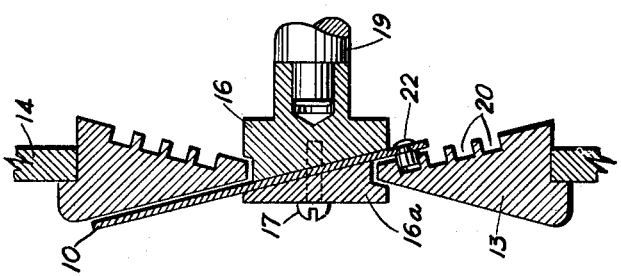
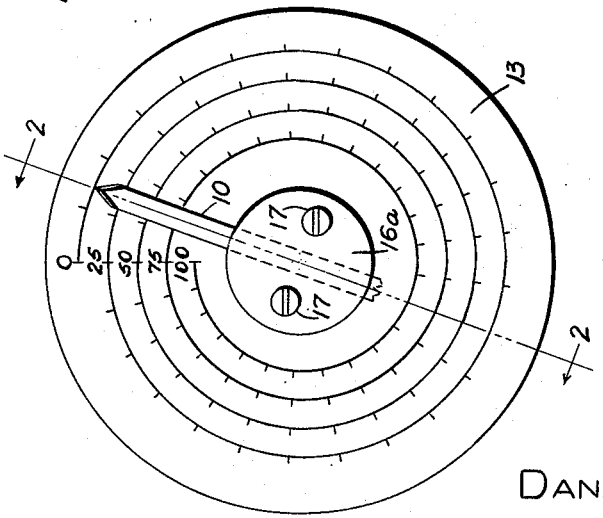
Inventor
DANA C. HOWARD

Inventor
DANA C. HOWARD
By C. E. Herrstrom & H. E. Thibodeau
Attorneys

May 21, 1946. D. C. HOWARD 2,400,553
DIAL AND POINTER APPARATUS
Filed March 31, 1945 3 Sheets-Sheet 3
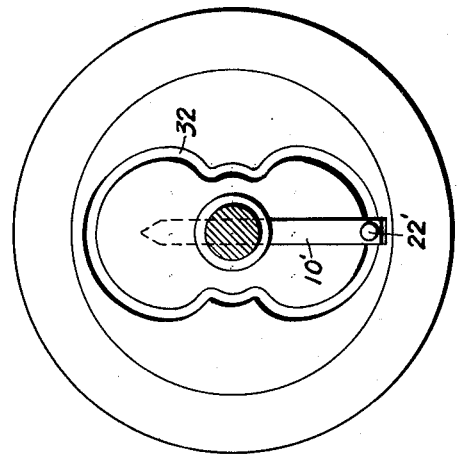
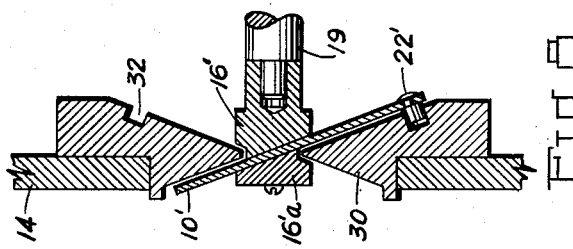
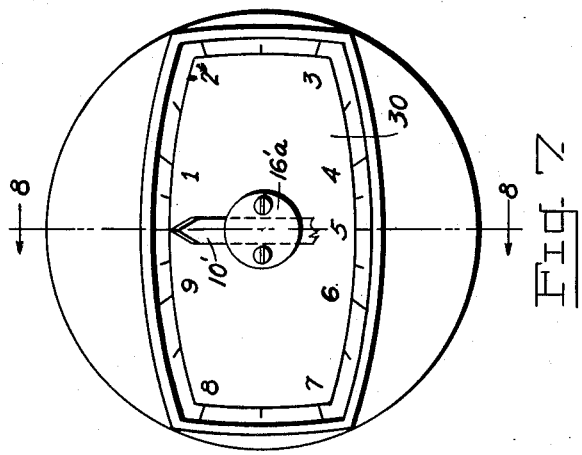
Inventor
DANA C. HOWARD
By C. E. Harrstrom & H. C. Thibodeau
Attorneys Patented May 21, 1946

2,400,553

UNITED STATES PATENT OFFICE 2,400,553

DIAL AND POINTER APPARATUS

Dana C. Howard, Springfield, Mass.

Application March 31, 1945, Serial No. 586,012

5 Claims. (Cl. 116—124)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to dial and pointer apparatus and it has particular reference to indicator element organizations useable on radio or other instruments where accurate or widely spaced readings are desired.

Broadly stated, the object of my invention is to improve the design and extend the usefulness of dial and pointer apparatus for instrument and other indicator use.

A more specific object is to provide improved means for causing the pointer end of an indicator to follow scale marking contours of non-circular or other special shape.

Another object is to provide the desired pointer following action without recourse to gears or other elements that introduce backlash and inaccuracy of reading.

A further object is to enable all necessary pointer following mechanism to be placed behind the dial out of sight and in a protected location.

A still further object is to simplify the manufacture, lower the cost, improve the ruggedness, and extend the adaptability of this class of apparatus.

An additional object is to widen the indicating range which conventional dial and pointer devices are capable of affording and thereby increase the number of readable points which may be placed on instrument dials.

A supplemental object is to provide for automatic return of the pointer to its starting point upon reaching the end of its operating cycle.

In practicing my invention I attain the foregoing and other objects and advantages through a novel organization of indicator elements wherein use is made of: (1) a dial member which carries on its front face scale markings laid out in pre-determined contour and which is provided on its rear face with a guiding element co-ordinated with the shape of said contour; (2) an indicator member having a pointer end movable over the dial's front face for registry with the scale markings and having a follower end movable over the dial's rear face for engagement with the guiding element and (3) a driving member or hub supporting the indicator in the relation aforesaid and imparting rotative movement thereto while permitting the indicator to be moved lengthwise by the guiding element in a way which keeps the pointer end in continuous registry with the scale marking contour on the dial's front face.

Illustrative forms of my invention are shown by the accompanying drawings wherein:

Fig. 1 is a view in front elevation of extended range apparatus which incorporates my invention;

Fig. 2 is a section on line 2—2 of Fig. 1, showing the major members comprised by my improved combination;

Fig. 3 is a view in rear elevation of the appaartus of Figs. 1-2, showing the spiral-shaped guiding element utilized thereby;

Figs. 7-8-9 are corresponding views showing the principle of my invention utilized in a still different way.

*Extended range apparatus of Figs. 1-2-3*

Figure 6:
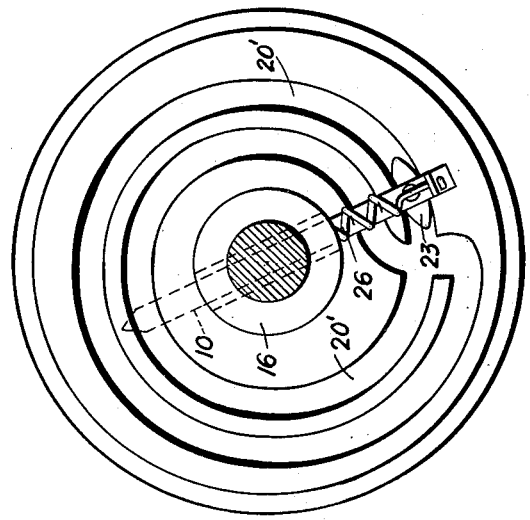
Fig. 6 is a rear elevation of the apparatus of Figs. 4-5.

Referring first to Figs. 1-2-3 I have there shown one preferred form of dial and pointer apparatus wherein the principles of my invention have been incorporated for purposes of increasing the number of readable points which may be placed on instrument dials. In these views a rotative indicator member is designated at 10; a stationary scale member with which the pointer end of the indicator registers is shown at 13; an instrument panel or other scale-supporting member at 14; and the hub which supports and drives the indicator at 16.

The shaft of the instrument with which my improved apparatus is used is shown at 19. This shaft is illustrative of a number of different sources of driving power with which hub 16 may be provided. These may include a knob (not shown) attached to the hub's front 16a; gearing (also not shown) by which the hub might also be rotated; or any of the other well known form of pointer driving means.

The front face of a scale member 13 is shown as being provided with markings laid out in the form of a spiral. One extreme end of this spiral is marked 0; the first complete turn thereof is marked 25; the second complete turn 50; the third complete turn 75; and the fourth complete turn 100. In this particular showing each of the complete spiral turns is divided into 25 equal divisions to which intermediate markings may be applied in well known manner.

The rear face of this scale member 13 is provided with a guiding element shown in the form of a groove 20 which is uniquely coordinated with the spiral shape of the scale marking contour just described. As the description proceeds, it will be seen that this guiding element may also take some form other than the groove 20, such as a raised ridge or the like.

In the illustrative construction shown the scale member 13 has the inwardly tapering cross section best represented by Fig. 2. Maximum thickness of the member is at its outer edge while minimum thickness is at the inner boundary or central opening through which driving hub 16 extends. The angle of this taper, moreover, is such that an extension of the scale member's front face through the hub passes somewhat back of but parallel to the scale's rear face on the opposite side of the hub.

In the illustrative form shown, hub 16 is of two piece construction, and its forward and rear diameters are somewhat larger than the central opening through scale member 13. The front portion 16a is secured to the body 16 of the hub by means of screws 17, and formed between the two parts is a groove into which the inner edge of scale member 13 fits in a way which permits ready turning.

Extending through this hub is a slot which accommodates the indicator 10 in a way permitting lengthwise movement thereof while conventional rotative motion is imparted thereto. In width this slot is just slightly greater than that of the indicator and, if desired, rotative backlash may further be eliminated by the use of side springs (not shown).

This unique form of mounting enables the forwardly exposed or pointer end of indicator 10 to be movable over scale 13's front face while the opposite or follower end of the indicator is concealed behind and movable over the scale's rear face. Carried by this follower end is a pin or roller 22 which fits into the rear face groove 20 and serves to slide the indicator 10 lengthwise through the hub 16 as that hub is rotated by the instrument shaft 19.

In operation of the apparatus of Figs. 1-2-3, clockwise rotation of hub 16 (as viewed from the front) progressively decreases the length of indicator 10 protruding from the hub in front of scale member 13. Starting with 0 the rate of this decrease is such that the indicator's pointer end is kept in constant register with the spiral contour of the scale markings. At the end of the first complete rotation the pointer end thus registers with marking 25 both rotatively and lengthwise; at the end of the second complete rotation there is similar registry with scale marking 50; at the end of the third rotation the indicator has been still further withdrawn to register with marking 75; and at the end of the fourth complete rotation registry with marking 100 has likewise been effected.

Counterclockwise rotation of hub 17 (as again viewed from the front) causes follower pin 22 progressively to increase the length of indicator 10 protruding from the hub and in this way advancement through four complete revolutions brings the indicator's pointer end into registry with scale marking 0 both rotatively and lengthwise of the indicator.

The apparatus of Figs. 1-2-3 thus causes each complete rotation of hub 16 to slide the indicator 10 lengthwise through the hub by the exact spacing between consecutive spirals on the scale's front face marking. As just explained, this sliding action keeps the indicator's pointer end in exact alignment with the marked spiral contour of Fig. 1 and thereby enables the extended range set-up to operate in a unique and highly satisfactory manner.

The apparatus illustrated accordingly registers not only the rotative position of hub 16 but also is effective to show the number of complete revolutions that the hub has made with respect to either extreme on the marked scale. The total range illustratively shown covers four complete revolutions of hub 16 and shaft 19. By modifications obvious to those skilled in the art either a greater or lesser number of rotations can readily be provided for. Moreover, scale markings either larger or smaller than the illustrated 25 divisions per revolution may readily be utilized. Still further, a spiral contour running in the opposite sense is useable with equal effectiveness.

Figure 5:
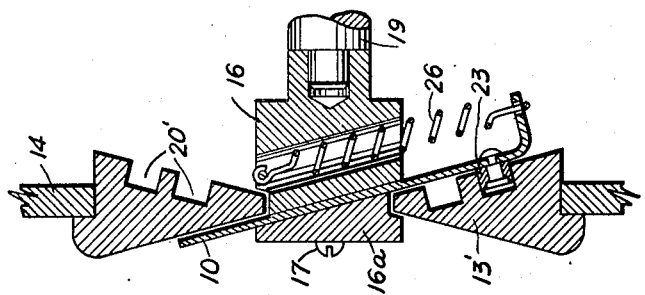
Fig. 5 is a section on line 5—5 of Fig. 4.
Figure 4:
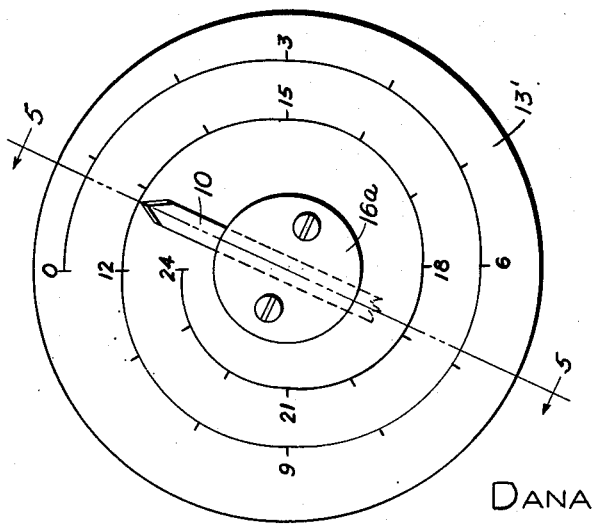
Fig. 4 is a front view representation of similar apparatus supplemented to include an automatic return feature.

*Automatic return organization of Figs. 4-5-6*

Referring next to Figs. 4-5-6, I have there shown how the basic organization of Figs. 1-2-3 may be supplemented to provide for automatic return of the indicator 10 to the starting point upon reaching the end of its operating cycle. Here the front face of stationary member 13' carries a spiral scale made up of two turns. The outer turn is marked 0 to 12 while the inner turn is marked 12 to 24.

The back of scale member 13' is provided with a guiding groove 20' coordinated with the front scale marking contour in the general manner of Figs. 1-2-3. Secured to the follower end of indicator 10 and riding in groove 20' is a boat-shaped member 23 which corresponds to pin roller 22 of Figs. 1-2-3.

A tension spring 26 attached as shown in Figs. 5-6 continuously urges the indicator's follower end inwardly towards the hub 16. The outer and inner spirals of groove 20' are, moreover, interconnected as shown in Fig. 6. These supplemental features provide the automatic indicator return action earlier mentioned.

In operation of the apparatus of Figs. 4-5-6 clockwise rotation of hub 16 (as viewed from the front) progressively decreases the length of indicator 10 protruding from the hub in front of scale member 13'. Starting with 0 the rate of this decrease is such that the indicator's pointer end is kept in constant register with the spiral contour of the scale markings.

At the end of the first complete rotation the pointer end thus registers with marking 12 both rotatively and lengthwise. At this point follower 23 spans the interconnecting way which Fig. 6 shows to extend between the outer and inner spirals of groove 20' in dial member 13's rear face. Further clockwise rotation of hub 16 accordingly is effective to maintain the pointer end in register with the 12 to 24 front scale spiral.

As the second full rotation of hub 16 is completed the follower 23 is pulled by spring 26 inwardly from the trailing end of groove 20's outer spiral (see Fig. 6) into the leading end of that groove's inner spiral. This pulling slides indicator 10 through hub 16 and quickly transfers the pointer end from front scale marking 24 back to front scale marking 0 (see Fig. 4). Continued clockwise rotation of hub 16 again progressively withdraws the indicator 10 and thereby causes the sequence of actions just described once more to be repeated.

*Non-circular scale of Figs. 7-8-9*

Referring finally to Figs. 7-8-9 I have there shown the principle of my invention as applied to a dial 30 carrying scale markings which the pointer 10' can fully traverse in moving through one and only one complete revolution. The scale markings of this dial 30 are laid out in the non-circular fashion illustrated by Fig. 7 and in order to keep the pointer end of indicator 10' in ideal register therewith the indicator's follower pin 22' rides in a groove 32 shaped in the unique manner shown by Fig. 9.

As the hub 16' rotates a peculiar shape of slot 32 causes the front or exposed end of pointer 10' always to stay in accurate register with the oblong scale contour shown by Fig. 7 and in this way accuracy of the pointer's registrations is substantially enhanced. By similar adaptations obvious to those skilled in the art the same result can readily be achieved with scale outlines of a wide variety of still different shapes.

*Summary*

From the foregoing, it will be seen that I have improved the design and extended the usefulness of dial and pointer apparatus for instrument and other indicator use; that I have provided improved means for causing the pointer end of an indicator to follow scale marking contour's of non-circular or other special shape; that I have provided the desired pointer following action without recourse to gears or other elements which introduce backlash and inaccuracy of reading; that I have enabled all necessary pointer following mechanism to be placed behind the dial out of sight and in a protected location; that I have simplified the manufacture, lowered the cost, improved the ruggedness, and extended the adaptability of this class of apparatus; that I have widened the indicating range which conventional dial and pointer devices are capable of affording and thereby increased the number of readable points which may be placed on instrument dials; and that I have provided for automatic return of the pointer to its starting point upon reaching the end of its operating cycle.

The principles of my invention thus are capable of exceedingly wide application and hence their utility is not limited to the three representative embodiments here shown by way of illustration.

I claim:

1. In combination, a dial, scale markings laid out in predetermined contour on the front face of said dial, a guiding element carried by the rear face of said dial and coordinated with the predetermined shape of said scale marking contour, an indicator having a pointed end movable over the dial's front face for registry with said scale markings and having a follower end movable over the dial's rear face, means engaging said indicator's follower end with said guiding element, and a driving hub serving to support said indicator in the relation aforesaid and organized to impart rotative movement thereto while permitting said guiding element to slide the indicator lengthwise through the hub in a way which keeps the indicator's pointer end in continuous registry with said scale marking contour.

2. In combination, a dial, scale markings laid out in predetermined contour on the front face of said dial, a guiding element carried by the rear face of said dial and coordinated with the shape of said scale marking contour, an indicator having a pointer end movable over the dial's front face for registry with said scale markings and having a follower end movable over the dial's rear face, a driving hub serving to support said indicator in the relation aforesaid and organized to impart rotative movement thereto while permitting lengthwise sliding of the indicator through the hub, and means carried by said indicator's follower end for engaging said guiding element whereby rotation of said hub causes the guiding element to slide the pointer through the hub and thereby keep the pointer end thereof in continuous registry with said scale marking contour.

3. In combination, a dial, scale markings laid out in spiral contour on the front face of said dial, a guiding element carried by the rear face of said dial and having a spiral shape coordinated with that of said scale marking contour, an indicator having a pointer end movable over the dial's front face for registry with said scale markings and having a follower end movable over the dial's rear face, means engaging said indicator's follower end with said guiding element, and a driving hub serving to support said indicator in the relation aforesaid and organized to impart rotative movement thereto while permitting said guiding element to slide the indicator lengthwise through the hub in a way which keeps the indicator's pointer end in continuous registry with said scale marking contour.

4. In combination, a dial, scale markings laid out in spiral contour on the front face of said dial, a guiding element carried by the rear face of said dial and having a spiral shape coordinated with that of said scale marking contour, an indicator having a pointer end movable over the dial's front face for registry with said scale markings and having a follower end movable over the dial's rear face, a driving hub serving to support said indicator in the relation aforesaid and organized to impart rotative movement thereto while permitting lengthwise sliding of the indicator through the hub, and means carried by said indicator's follower end and engaging said guiding element whereby rotation of said hub causes the guiding element to slide the pointer through the hub and thereby keep the indicator end thereof in continuous registry with said scale marking contour.

5. In combination, a dial, scale markings laid out in spiral contour on the front face of said dial and embracing at least two complete spiral turns, a guiding element carried by the rear face of said dial and having a spiral shape coordinated with that of said scale marking contour and embracing a like number of complete spiral turns, means interconnecting the extreme ends of said guiding element's spiral, an indicator having a pointer end movable over the dial's front face for registry with said scale markings and having a follower end movable over the dial's rear face, a driving hub serving to support said indicator in the relation aforesaid and organized to impart rotative movement thereto while permitting lengthwise sliding of the indicator through the hub, a follower guide attached to said indicator's follower end and engaging said guiding element whereby rotation of said hub in a given direction causes the guiding element to keep the indicator's pointer end in continuous registry with said scale marking contour, and resilient means exerting upon said indicator a force which transfers said follower guide from one extreme end of said guiding element spiral to the other when given-direction rotation of said hub advances the guide to said interconnecting means at the guiding element spiral's extreme end.

DANA C. HOWARD.